Jan. 16, 1968 S. OLSZEWSKI 3,363,925
SPRING MOUNTED BUMPER
Filed Oct. 17, 1966
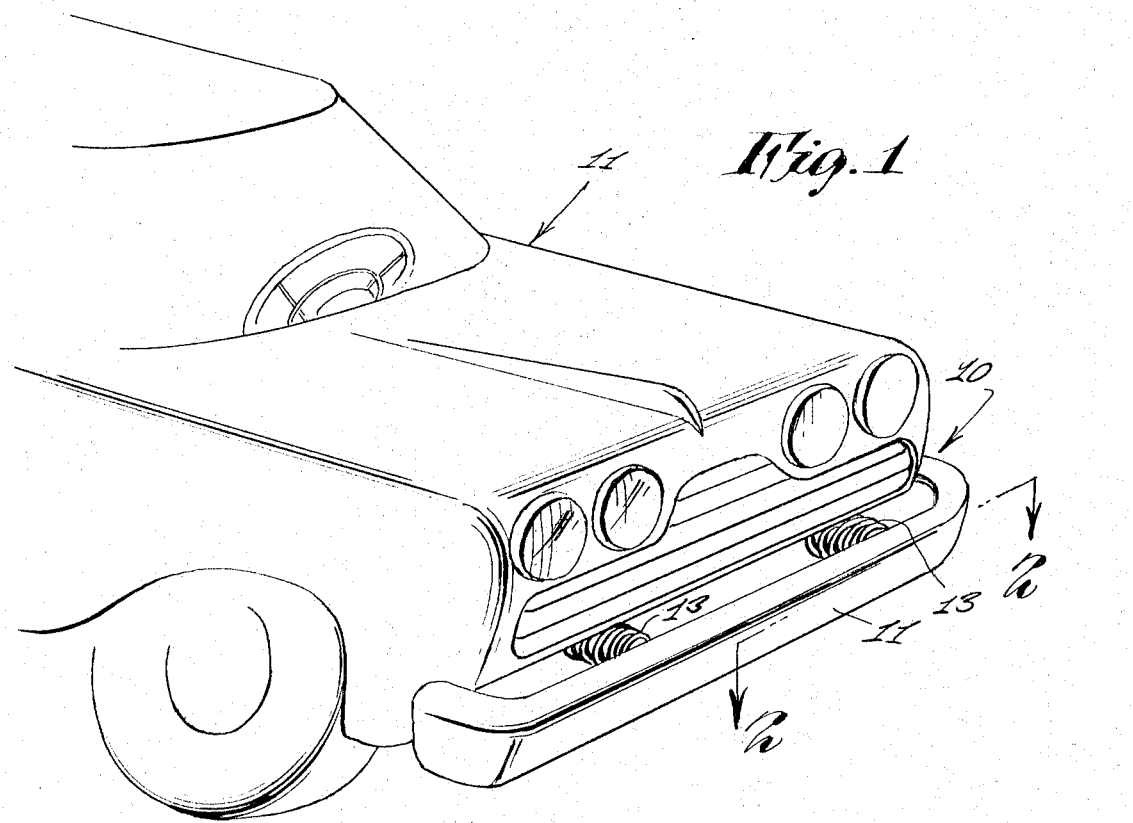
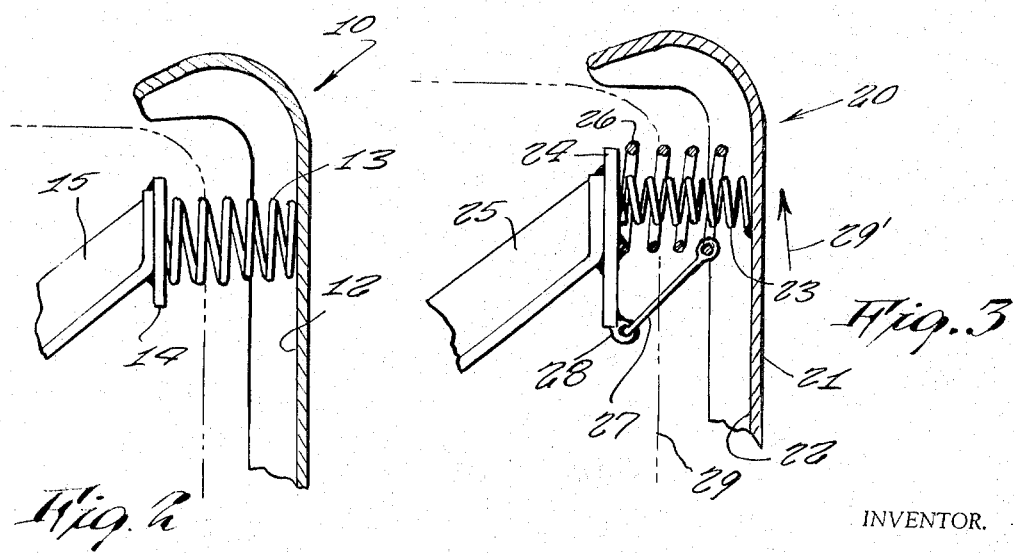
INVENTOR.
SOPHIE OLSZEWSKI

United States Patent Office 3,363,925
Patented Jan. 16, 1968

3,363,925
SPRING MOUNTED BUMPER
Sophie Olszewski, 304 N. Booth St.,
Milwaukee, Wis. 53212
Filed Oct. 17, 1966, Ser. No. 587,131
1 Claim. (Cl. 293—85)

ABSTRACT OF THE DISCLOSURE

A front bumper for an automobile including a pair of concentric compression springs near each end between the bumper and chassis, and a lever for moving one of the springs laterally when compressed by the bumper upon impact with another object, thus causing the bumper also to move laterally in the same direction.

---

This invention relates generally to automotive vehicles. More specifically it relates to automobile bumper supports.

It is generally well known that in the present construction of automobile bumpers, a relatively severe shock is encountered when the vehicle bumper comes into collision with another object. In most instances this shock could be lessened if the bumper were not rigidly affixed to the frame of the vehicle, thereby eliminating some of the harm that comes from a sudden shock due to impact.

Accordingly it is a principal object of the present invention to provide a safety bumper for use upon automotive vehicles and which has self-contained means to absorb a portion of the shock caused by impact with another object.

Another object of the present invention is to provide a safety bumper for an automotive vehicle which is supported upon springs that are in turn secured to the automotive frame.

Still another object of the present invention is to provide a safety bumper for an automotive vehicle wherein the spring supported bumper is flexed or moved additionally laterally sideward upon impact, thereby throwing off sidewardly the object that has collided therewith.

Other objects of the present invention are to provide a safety bumper which is simple in design, inexpensive to manufacture, rugged in construction, easy to use and efficient in operation.

These and other objects will be readily evident upon a study of the following specification and the accompanying drawing wherein:

FIGURE 1 is a perspective view of an automotive vehicle, shown fragmentarily, and showing the present invention incorporated therewith;

FIGURE 2 is a cross-sectional view taken on the line 2—2 of FIGURE 1;

FIGURE 3 is a view similar to FIGURE 2 and showing a modified form of construction.

Referring now to the drawing in detail the numeral 10 represents a safety bumper for an automotive vehicle according to the present invention wherein there is a bumper 11 made from a relatively heavy gauge steel in a conventional manner and which surmounts the forward and rear ends of an automotive vehicle 11, so to save the body of the vehicle in case of a collision with an object in front thereof or with an object in the rear thereof.

The bumper 10 is affixed on its rear side 12 to one end of a pair of spaced apart coil springs 13, the opposite ends of the springs being rigidly affixed to steel plates 14 that are secured to the forward end of the automotive frame or chassis frame 15.

In operative use when the bumper comes into contact with another object, the bumper will receive the initial shock due to impact and transmit a portion thereof into the springs which recoil and gradually transmit a portion of the shock to the automobile body. Thus the initial shock is not delivered in all its severity directly to the automobile body but is withheld by the coil springs.

In the modified construction shown in FIGURE 3, the safety bumper 20 includes a bumper 21 which is connected on its rear side 22 to one end of a pair of spaced apart coil springs 23 the opposite ends of the coil springs being secured to a steel plate 24, mounted upon the front end of the chassis frame 25. A second coil spring 26 of relatively greater strength and of relatively larger size is concentrically mounted around the first coil spring 23 and secured also to the plate 24. As shown in FIGURE 3, the one end of the coil spring 26 does not come into engagement with the bumper 21 and is accordingly spaced apart therefrom. This end of the coil spring 26 is secured to a pivotable link 27 that is pivoted at its opposite end about an opening in a lug 28 secured to plate 24.

In operative use, upon impact with another object the bumper is moved toward the body 29 of the automotive vehicle in a manner which is the same as above described from FIGURE 2. During this movement the first spring 23 is absorbing the initial shock. If the shock is sufficiently severe then the bumper comes into contact with the relatively stronger spring 26 which then also begins to contract toward the automobile body 29 and at the same time is caused by the link 27 to move the bumper 23 in a lateral direction as indicated by the arrow 29. Due to the opposite end of the bumper being supported upon a like dual spring construction, then the link 27 at the opposite end of the bumper will cause the bumper to be tilted in a lateral direction if the bumper is struck at the opposite end. Thus it will be readily evident that an object coming into contact with the bumper will be thrown sidewardly away so as to lessen the danger of coming into contact with the automobile body.

While various changes may be made in the detailed construction it is understood such changes will be within the spirit and scope of the present invention as defined by the appended claim.

I claim:

1. In a safety bumper, the combination of a bumper member and support means for said bumper, said support means having self-contained means for absorbing an initial shock caused by impact of said bumper with another object, said means comprising a pair of compression coil springs, said coil springs being in spaced apart relation and secured by their one ends to the rear side of said bumper member, the opposite ends of said coil springs being secured each to a plate mounted upon the front end of the automobile chassis frame, said means further comprising a second compression coil spring, said second compression coil spring being secured concentrically around the first said compression coil spring and mounted by its one end to said plate, said second coil spring being of relatively greater strength and being relatively shorter in length whereby the forward end of said second spring is not in normal engagement with the rear end of said bumper, said end of said second spring not engaged with the bumper being secured on one lateral side to one end of a pivotable link, said link extending diagonally respective to an axis of said coil springs, the opposite end of said pivotable link being secured in an opening in a lug secured upon said plate to cause said coil spring to move laterally, sideward when depressed by said bumper member, thereby causing an object in collision with the bumper to be thrown laterally sideward away and out of the path of the automobile body.

References Cited

UNITED STATES PATENTS

| | | | |
|---|---|---|---|
| 1,372,839 | 3/1921 | Solomon | 293—85 |
| 1,416,358 | 5/1922 | Krefl | 293—85 XR |
| 1,504,548 | 8/1924 | Gentle | 293—85 XR |
| 1,530,017 | 3/1925 | Souliotis | 293—85 XR |
| 2,573,510 | 10/1951 | Terranova | 293—85 |
| 2,606,785 | 8/1952 | Fisher | 293—85 XR |

ARTHUR L. LA POINT, *Primary Examiner.*

H. BELTRAN, *Assistant Examiner.*